US009249030B2

(12) United States Patent
Peterson et al.

(10) Patent No.: US 9,249,030 B2
(45) Date of Patent: Feb. 2, 2016

(54) METHOD OF MAKING SODIUM CARBONATE AND/OR SODIUM BICARBONATE

(71) Applicant: New York Synthetics, Inc., New York, NY (US)

(72) Inventors: Richard L. Peterson, Aberdeen, SD (US); Luke Ice, Fort Wayne, IN (US); Omar Bradley Sheikh, West Bloomfield, MI (US); Omar Ayaz Hussein, Alpine, NJ (US)

(73) Assignee: NEW YORK SYNTHETICS, INC., New York, NY (US)

( * ) Notice: Subject to any disclaimer, the term of this patent is extended or adjusted under 35 U.S.C. 154(b) by 126 days.

(21) Appl. No.: 14/015,606

(22) Filed: Aug. 30, 2013

(65) Prior Publication Data

US 2014/0286850 A1   Sep. 25, 2014

Related U.S. Application Data

(60) Provisional application No. 61/803,587, filed on Mar. 20, 2013.

(51) Int. Cl.
  *C01D 7/14* (2006.01)
  *C01D 7/07* (2006.01)
(52) U.S. Cl.
  CPC ... *C01D 7/14* (2013.01); *C01D 7/07* (2013.01)
(58) Field of Classification Search
  CPC .................................... C01D 7/07; C01D 7/14

USPC ......................... 423/421, 422, 429
See application file for complete search history.

(56) References Cited

U.S. PATENT DOCUMENTS

| | | | | |
|---|---|---|---|---|
| 2,918,351 | A | * | 12/1959 | Barton ..................... 252/186.36 |
| 3,896,213 | A | | 7/1975 | Hirdler |
| 4,620,969 | A | | 11/1986 | Wilkinson |
| 7,704,370 | B2 | | 4/2010 | Coustry et al. |
| 7,708,972 | B2 | | 5/2010 | Coustry et al. |
| 7,727,374 | B2 | | 6/2010 | Jones |
| 2009/0260993 | A1 | | 10/2009 | Coustry et al. |
| 2010/0147698 | A1 | | 6/2010 | Coustry et al. |

FOREIGN PATENT DOCUMENTS

GB       1538829 A       1/1979

OTHER PUBLICATIONS

Notification of Transmittal of the International Search Report and the Written Opinion of the International Searching Authority regarding International Application No. PCT/US2014/031215; dated Jul. 14, 2014; 4 pages.
Written Opinion of the International Searching Authority regarding International Application No. PCT/US2014/031215; dated Jul. 14, 2014; 5 pages.

* cited by examiner

*Primary Examiner* — Richard M Rump
(74) *Attorney, Agent, or Firm* — Cantor Colburn LLP

(57) ABSTRACT

A method of making sodium carbonate and/or sodium bicarbonate is disclosed in which carbon dioxide gas is reacted with an aqueous solution sodium hydroxide solution in the presence of a compound of the formula (I): $Na^+[X-O]^-$ where X is Cl, Br, or I.

14 Claims, 3 Drawing Sheets

METHOD OF MAKING SODIUM CARBONATE AND/OR SODIUM BICARBONATE

BACKGROUND OF THE INVENTION

Sodium carbonate is a widely-used product, with many applications in foods, as well as many other applications such as in cleaning, textile, and other industrial and commercial applications. Much of worldwide sodium carbonate production uses a process known as the "Solvay process", which involves the reaction of carbon dioxide produced by thermal decomposition of calcium carbonate, with a solution of sodium chloride and ammonia to produce sodium bicarbonate, followed by thermal decomposition of the sodium bicarbonate to form sodium carbonate. However, high capital costs involved with building and operating the Solvay process have invited alternative approaches for making sodium carbonate.

One such alternative type of process is described in U.S. Pat. No. 7,708,972, U.S. Pat. No. 8,202,659, and U.S. Patent Application Publication 2010/0147698 A1, the disclosure of each of which is incorporated by reference in its entirety herein. This process involves a carbonation reaction between carbon dioxide and an aqueous sodium hydroxide brine solution produced by electrolysis of a sodium chloride solution. Other features of this process include generation of carbon dioxide for the carbonation reaction by reacting calcium carbonate (e.g., from limestone) with hydrochloric acid, and generating the hydrochloric acid by reacting chlorine gas and hydrogen gas produced by the electrolysis. Additional features include separation and purification of the sodium carbonate produced by the carbonation reaction, and recovery and recycle of sodium chloride from the electrolysis byproducts. Although this process can be effective, it also has certain limitations, such as requiring high levels of sodium hydroxide (e.g., at least 25 wt. % concentration) and/or high temperature levels (e.g., above 100° C. or above 110° C.) in order to achieve target efficiency levels.

Many other processes have been used or proposed for the production of sodium carbonate, and each of them has its own advantages and disadvantages. However, new and different processes and systems for producing sodium carbonate, which may afford opportunities for improved performance, cost, reliability, process variation tolerance, etc., are always welcome in the art.

SUMMARY OF THE INVENTION

According to one aspect, a method of making sodium carbonate and/or sodium bicarbonate comprises reacting carbon dioxide gas with an aqueous solution comprising sodium hydroxide in the presence of a compound of the formula (I): $Na^+[X-O]^-$ where X is Cl, Br, or I.

According to further aspects, the aqueous solution comprising sodium hydroxide is generated by electrolysis of a solution comprising sodium chloride. In further aspects, the compound according to formula (I) is sodium hypochlorite, which can be generated by reaction of water and chlorine gas formed by electrolysis of a sodium chloride solution.

According to another aspect, a system for producing sodium carbonate comprises: (a) an electrical cell reactor for electrolysis of a solution comprising sodium chloride, comprising a cathode chamber and an anode chamber separated by a membrane, an outlet connected to the anode chamber configured for collecting chlorine gas from the anode chamber, and an outlet connected to the cathode chamber configured for collecting an aqueous solution comprising sodium hydroxide from the cathode chamber; (b) a reactor for reacting a liquid comprising the aqueous solution collected from the cathode chamber in (a) with a gas comprising chlorine collected from the anode chamber in (a) to produce sodium hypochlorite; and (c) a carbonation reactor for reacting an aqueous liquid comprising the aqueous solution collected from the cathode chamber in (a) and sodium hypochlorite produced in (b) with a gas comprising carbon dioxide to produce sodium carbonate.

BRIEF DESCRIPTION OF THE DRAWINGS

The foregoing and other features, and advantages of the invention are described in the following detailed description taken in conjunction with the accompanying drawings in which.

DETAILED DESCRIPTION

Figure 1:
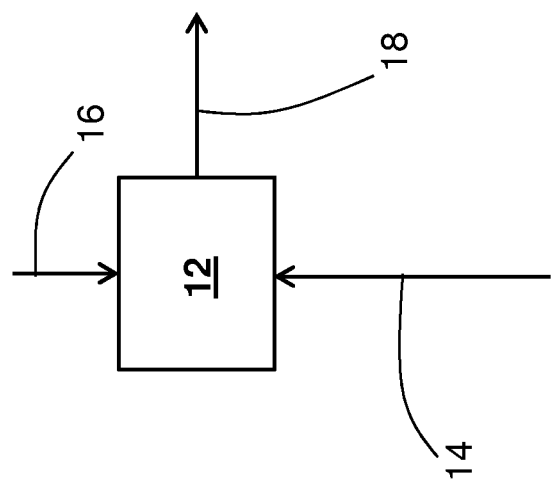
FIG. 1 schematically depicts a representative embodiment of a process and system for producing sodium carbonate.

Turning now to the figures, an exemplary system and process for making sodium carbonate is schematically depicted. As shown in FIG. 1, system/process 10 is shown with carbonation reactor 12, into which is fed an aqueous solution 16 comprising sodium hydroxide and a compound according to formula (I). The nucleophilic reaction between the carbon dioxide and the aqueous sodium hydroxide produces sodium carbonate product 18. As used herein, "sodium carbonate" is defined broadly to include not only anhydrous sodium carbonate, but also hydrated sodium carbonates. The reaction between carbon dioxide and aqueous sodium hydroxide produces hydrated sodium carbonates and/or sodium bicarbonate. In some embodiments, hydrated sodium carbonates can be further processed to purify and subject the hydrated sodium carbonates to heat-induced desiccation to produce purified anhydrous sodium carbonate, and the sodium bicarbonate can be subjected to a heat-induced decomposition reaction to form sodium carbonate plus water and carbon dioxide.

Figure 2:
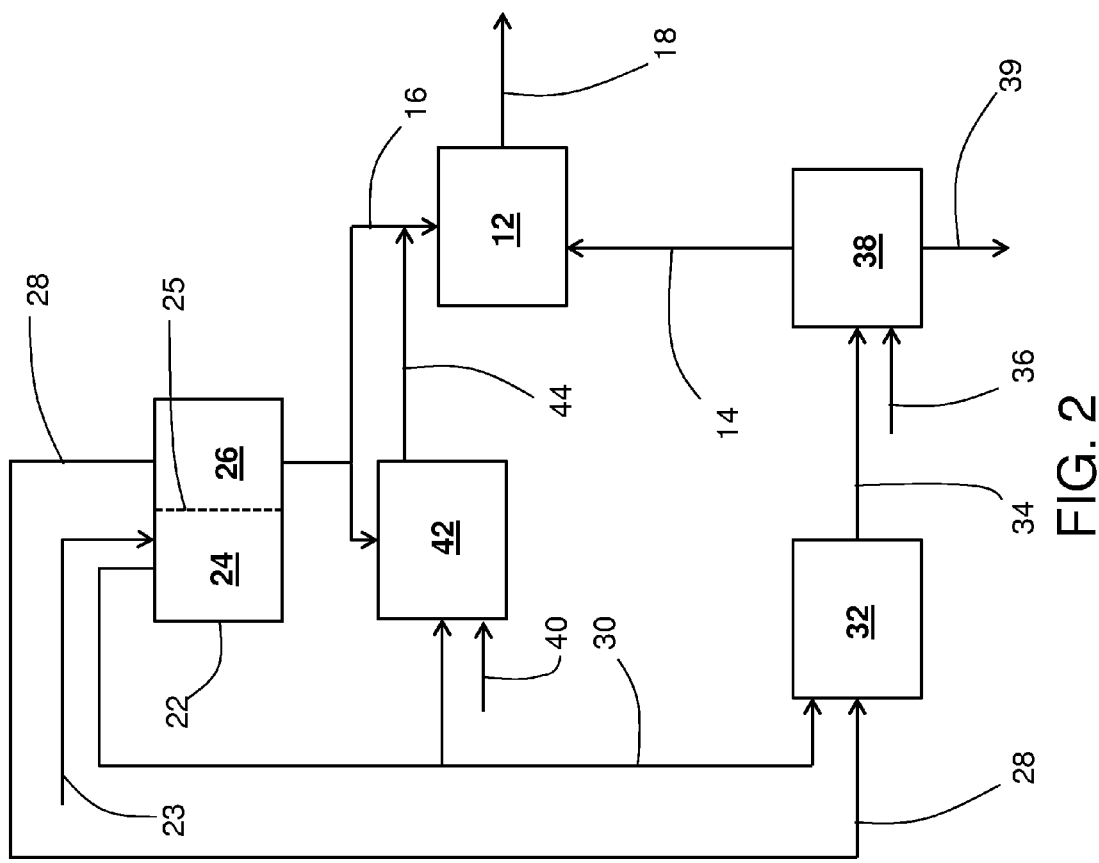
FIG. 2 schematically depicts another representative embodiment of a process and system for producing sodium carbonate.

Turning now to FIG. 2, further detail is shown of an exemplary embodiment in which an aqueous solution of sodium chloride is subjected to hydrolysis to generate the sodium hydroxide for use in the carbonation reaction. As shown in FIG. 2, a system/process 20 is shown with an electrolysis cell reactor 22 having an anode chamber 24 and a cathode chamber 26 separated by a membrane 25 that is impermeable to water, but selectively permeable to ions. Anode chamber 24 is initially charged with a solution or brine of sodium chloride and cathode chamber 26 is initially charged with water. The cathode and anode are subjected to a difference in electronegative potential through an external circuit to drive the electrolysis reaction, as is well-known in the art. The resulting electrochemical reactions produce hydroxide ions in the cathode chamber 26, which combine with sodium ions that migrate from the anode chamber 25 through the membrane 25 to form sodium hydroxide. The resulting aqueous sodium hydroxide solution 16 exits the cathode chamber 26, is combined with a compound according to formula (I) from stream 44, and is delivered to the carbonation reactor 12. A hydrogen stream 28 is also produced in the cathode chamber 26. The anode chamber 24 produces a chlorine gas stream 30 and a dilute brine solution stream 17. The hydrogen stream 28 and the chlorine gas stream 30 are delivered to HCl reactor 32, where they are reacted together in a highly exothermic reaction to form hydrogen chloride stream, which is delivered to $CO_2$-generating reactor 38. Heat generated by the HCl reactor 32 can be used to provide heat for other parts of the process or for generating electricity, as is known in the art. The hydrogen chloride stream 34 is delivered to the $CO_2$-generating reactor 38, where it reacts with calcium carbonate, which can be provided by limestone as a raw material. The reaction of hydrogen chloride with calcium carbonate produces a carbon dioxide stream 14, which is delivered to the carbonation reactor 12. The $CO_2$-generating reactor 38 also produces calcium chloride 39, which can be disposed of as a waste stream and/or used in other process steps such as purification (e.g., desulfation) of brine compositions for use in the electrolysis reaction.

In some embodiments, the products of the electrolysis reaction can also be used to generate sodium hypochlorite as the compound according to formula (I) for the carbonation reaction. As shown in FIG. 2, a portion of the chlorine gas stream 30 is directed to sodium hypochlorite reactor 42, where it is reacted with aqueous sodium hydroxide solution an electrolysis reaction to form sodium hypochlorite. This reaction is well-known in the art and does not require further detailed explanation. The aqueous sodium hydroxide solution for the sodium hypochlorite reaction can be provided by diverting a portion of the aqueous sodium hydroxide solution 16 produced by the electrolysis cell reactor 22 to the sodium hypochlorite reactor 42. Water 40 can be added to provide the appropriate concentration level of sodium hydroxide in the sodium hypochlorite reactor 42. Sodium hypochlorite in stream 44 produced by the sodium hypochlorite reactor 42 is then introduced to the aqueous sodium hydroxide solution 16 upstream of the carbonation reactor 12 for use in the carbonation reaction.

Figure 3:
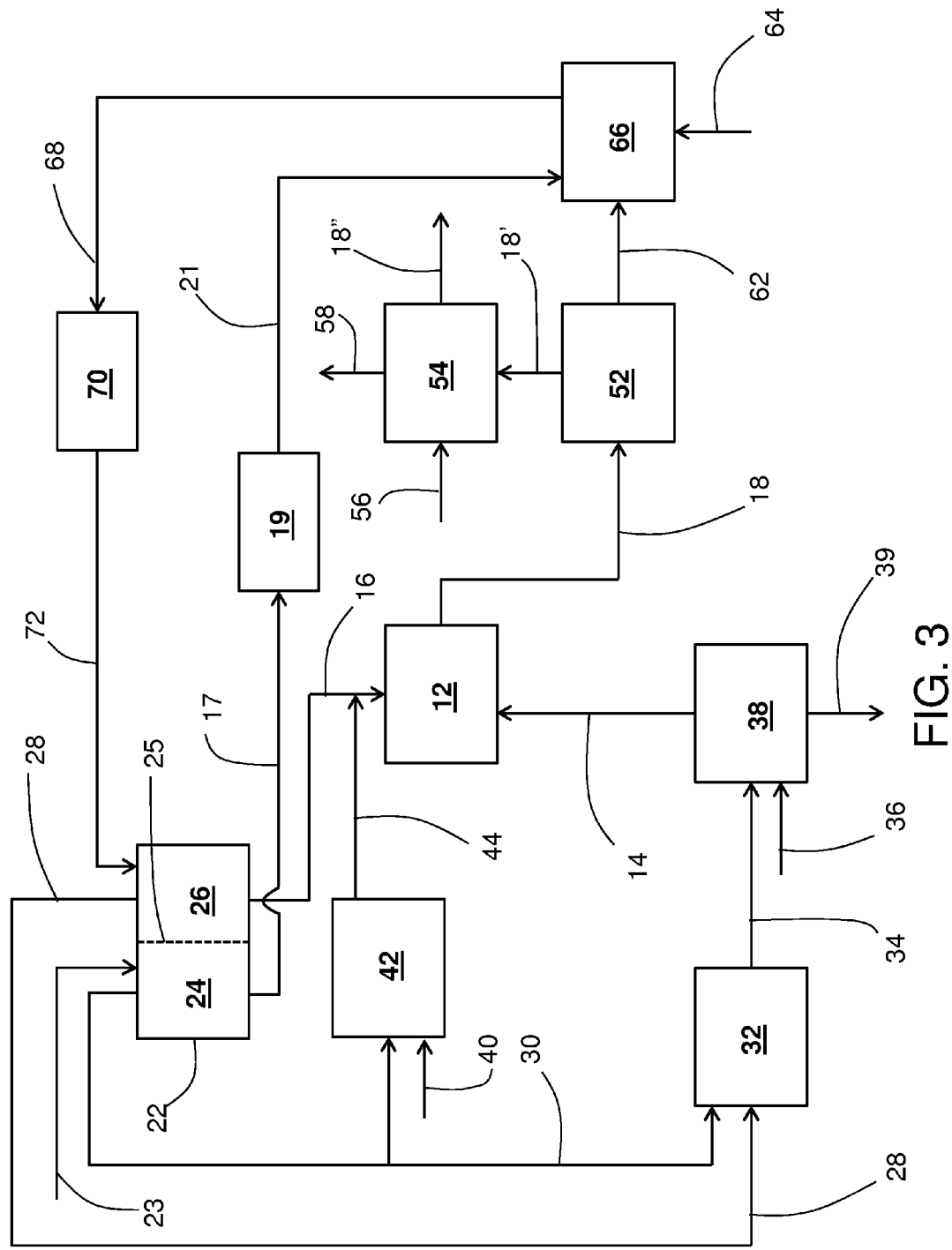
FIG. 3 schematically depicts another representative embodiment of a process and system for producing sodium carbonate.

Of course, the crude hydrated sodium carbonate 18 produced by the carbonation reactor is typically subjected to further purification processing in order to meet product specification targets. Such processing is shown in more detail in system 50 of FIG. 3, along with details about the provision of sodium chloride and water to the electrolysis cell reactor 22. As shown in FIG. 3, the crude sodium carbonate stream 18, which includes the reacted aqueous solution 16 and particles of hydrated sodium carbonate is delivered to separator 52, which separates the hydrated sodium carbonate particles 18' from the mother liquor 62. The hydrated sodium carbonate particles 18' are delivered to drying vessel 54, where heated air stream 56 subjects the hydrated sodium carbonate particles 18' to desiccation processing. Heat applied in the drying vessel 54 can also thermally decompose any sodium bicarbonate formed in the carbonation reactor 12 to form sodium carbonate, water, and $CO_2$. Air/water vapor stream 58 is exhausted from the drying vessel 54, while anhydrous sodium carbonate 18" is produced as a final product.

FIG. 3 also shows further details about processing of the liquid product of the anode chamber 24 of the electrolysis cell reactor 22. This liquid is depleted of sodium ions that migrated to the cathode chamber 26 and of chloride ions that formed chlorine gas stream 30, and can be referred to as a dilute brine. The dilute brine stream 17 is delivered to purification section 19, where one or more purification stages can involve desulfation, dechlorination, and/or dechloratation. The purified dilute brine 21 is delivered to sodium chloride source 66 such as a salt storage pile. The mother liquor 62 from the separator 52 is also delivered to the sodium chloride source 66, along with water 64, to generate saturated sodium chloride brine 68. The saturated sodium chloride brine 68 is delivered to purification section 70, where it can be subjected to purification stages including desulfation, calcium removal, and/or magnesium removal (depending on the purity of the sodium chloride source 66), after which it may be subjected to mechanical vapor compression to re-saturate the solution with sodium chloride. Purified saturated sodium chloride solution 72 is delivered to the cathode chamber 26, and water 23 is delivered to anode chamber 24 of the electrolysis cell reactor 22.

Although the present invention is not bound to or limited by any particular theory of operation, the carbonation reaction of carbon dioxide with aqueous sodium hydroxide is believed to proceed by nucleophilic addition to the electrophilic carbonyl groups on the carbon dioxide molecule. Again, not being bound by any particular theory of operation, the compound according to formula (I) such as sodium hypochlorite is believed to assist in the nucleophilic attack on the carbonyl groups to create the reactive carbonyl anion. Almost any amount of sodium hypochlorite can be used, with exemplary amounts ranging from 0.1 to 10 wt. % based on the total weight of the aqueous sodium hydroxide solution, more specifically from 0.5 to 5 wt. %, and even more specifically from 1 to 2 wt. %.

The amount of sodium hydroxide used for the carbonation reaction can also vary widely. Although the compound according to formula (I) can be effectively used in conjunction with sodium hydroxide levels in excess of 25 wt. % such as the sodium hydroxide levels described in the above-referenced U.S. Pat. No. 7,708,972, it was quite surprising that the formula (I) compound could, in some embodiments, help to provide sufficient reactivity so that lower levels of sodium hydroxide can be used. In some embodiments, the sodium hydroxide level is less than 35 wt. %, more specifically less than 25 wt. %, even more specifically less than 23 wt. %, and even more specifically less than 20 wt. %, based on the total weight of the aqueous solution. In some embodiments, the molar ratio of [formula (I) compound]:[NaOH] can range from $2.69 \times 10^{-3}:1.0$ to $2.69 \times 10^{-1}:1.0$, more specifically from $1.34 \times 10^{-2}:1.0$ to $1.34 \times 10^{-1}:1.0$, and even more specifically from $2.69 \times 10^{-2}:1.0$ to $5.36 \times 10^{-2}:1.0$.

The temperature of the carbonation reaction can also vary widely. Although formula (I) compounds such as sodium hypochlorite can be effectively used in conjunction with reaction temperatures in excess of 100° C. as described in the above-referenced US 2009/0260993 A1, it was quite surprising that the formula (I) compound could, in some embodiments, help to provide sufficient reactivity so that lower temperatures can be used. In some embodiments, the reaction temperature is less than 100° C., more specifically less than 105° C., even more specifically less than 110° C., and even more specifically less than 115° C. In some embodiments, exemplary reaction temperatures can range from 25° C. to 150° C., more specifically from 50° C. to 100° C., and even more specifically from 70° C. to 85° C.

The invention is further described below in the following non-limiting example(s).

Examples

A reaction mixture was prepared by diluting 1000 mL of a (5% m/m) sodium hypochlorite solution with 3000 mL of water followed by the addition of 1000 grams of sodium hydroxide. The resulting solution was subsequently reacted with carbon dioxide gas which was introduced to the reaction mixture using an aerator. The reaction was conducted at atmospheric pressure at an autogenously generated temperature ranging from 60-85° C. The reaction was allowed to proceed for 90 minutes or until the production of sodium carbonate caused the formation of a mixture so dense that carbon dioxide could no longer be percolated through the sodium carbonate slurry. The sodium carbonate was recovered from the reaction vessel and dried in an oven at approximately 150° C. or in some instances the samples were dried using a microwave oven. The dried samples were heated further at 250° C. to dehydrate the sodium carbonate to its anhydrous form prior to analysis by acid titration. The isolated samples were determined to have greater than 99.5% purity.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A method of making sodium carbonate and/or sodium bicarbonate, comprising reacting carbon dioxide gas with an aqueous solution comprising sodium hydroxide in the presence of sodium hypochlorite, wherein the sodium hypochlorite and sodium hydroxide are present in the aqueous solution at a molar ratio of NaClO:NaOH of from $2.69 \times 10^{-3}$:1.0 to $2.69 \times 10^{-1}$:1.0.

2. The method of claim 1, further comprising generating the aqueous solution comprising sodium hydroxide by electrolysis of an aqueous solution comprising sodium chloride in an electrical cell comprising a cathode chamber and an anode chamber separated by a membrane.

3. The method of claim 2, further comprising collecting aqueous solution comprising sodium hydroxide from the cathode chamber, and reacting it with chlorine gas collected from the anode chamber to produce sodium hypochlorite as the compound of formula (I).

4. The method of claim 1, wherein the aqueous solution reacted with the carbon dioxide gas comprises less than 25 wt. % sodium hydroxide, based on the total aqueous solution weight.

5. The method of claim 1, wherein the aqueous solution reacted with the carbon dioxide gas comprises less than or equal to 23 wt. % sodium hydroxide, based on the total aqueous solution weight.

6. The method of claim 1, wherein the aqueous solution reacted with the carbon dioxide gas comprises less than or equal to 20 wt. % sodium hydroxide, based on the total aqueous solution weight.

7. The method of claim 1, wherein the aqueous solution reacted with the carbon dioxide gas comprises at least 25 wt. % sodium hydroxide, based on the total aqueous solution weight.

8. The method of claim 1, wherein the sodium hypochlorite is present in the aqueous solution in an amount of from 0.1 to 10 wt. %, based on the total aqueous solution weight.

9. The method of claim 1, wherein the sodium hypochlorite is present in the aqueous solution in an amount of from 0.5 to 5 wt. %, based on the total aqueous solution weight.

10. The method of claim 1, wherein the sodium hypochlorite and the sodium hydroxide are present in the aqueous solution at a molar ratio of NaClO:NaOH of $2.69 \times 10^{-2}$:1.0 to $5.36 \times 10^{-2}$:1.0.

11. The method of claim 1, wherein the carbon dioxide gas is reacted with the aqueous solution comprising sodium hydroxide at a temperature less than 100° C.

12. The method of claim 1, wherein the carbon dioxide gas is reacted with the aqueous solution comprising sodium hydroxide at a temperature of 35° C. to 85° C.

13. The method of claim 1, further comprising reacting hydrogen chloride with calcium carbonate to form the carbon dioxide gas.

14. The method of claim 1, wherein the carbon dioxide gas and aqueous solution comprising sodium hydroxide and sodium hypochlorite are introduced to a carbonation reactor, and sodium carbonate and/or sodium bicarbonate is removed from the carbonation reactor.

* * * * *